United States Patent [19]
Sonnenschein et al.

[11] Patent Number: 6,125,080
[45] Date of Patent: Sep. 26, 2000

[54] UNDERWATER COMMUNICATION APPARATUS AND COMMUNICATION METHOD

[75] Inventors: Menashe Sonnenschein, Beer-Sheva; Dov Wulich, Metar; Elazar Sonnenschein, Beer-Sheva, all of Israel

[73] Assignee: Divecom Ltd., Omer, Israel

[21] Appl. No.: 09/134,597

[22] Filed: Aug. 14, 1998

[30] Foreign Application Priority Data

Aug. 18, 1997 [IL] Israel ......................................... 121561

[51] Int. Cl.$^7$ .................................................. H04B 11/00
[52] U.S. Cl. ............................................ 367/134; 367/910
[58] Field of Search ................................. 367/132, 134, 367/910; 340/850

[56] References Cited

U.S. PATENT DOCUMENTS

| | | |
|---|---|---|
| 3,737,857 | 6/1973 | Carman . |
| 3,909,773 | 9/1975 | Saltzer . |
| 3,944,967 | 3/1976 | Acks et al. . |
| 3,995,578 | 12/1976 | McCullough . |
| 4,463,452 | 7/1984 | Chase, Jr. . |
| 4,563,758 | 1/1986 | Paternostro . |
| 4,679,177 | 7/1987 | Aoyagi et al. . |
| 5,010,529 | 4/1991 | Maynus . |
| 5,018,114 | 5/1991 | Mackelburg et al. . |
| 5,121,366 | 6/1992 | Wayner et al. . |
| 5,124,955 | 6/1992 | Jackson et al. . |
| 5,136,555 | 8/1992 | Gardos . |
| 5,301,167 | 4/1994 | Proakis et al. . |
| 5,303,207 | 4/1994 | Brady et al. . |
| 5,331,602 | 7/1994 | McLaren . |
| 5,392,771 | 2/1995 | Mock et al. . |
| 5,432,754 | 7/1995 | Brady et al. . |
| 5,523,982 | 6/1996 | Dale . |
| 5,539,705 | 7/1996 | Akerman et al. . |
| 5,784,339 | 7/1998 | Woodsum et al. . |

FOREIGN PATENT DOCUMENTS

| | | | |
|---|---|---|---|
| 9188967 | 6/1992 | Australia | .................. 367/134 |
| 2141619 | 8/1996 | Canada . | |
| 2 288 479 | 10/1995 | United Kingdom . | |

OTHER PUBLICATIONS

W.R. Garmer, "An Improved Acoustic Communication System for Autonomous Underwater Vehicles", Proceeding of the 1992 Symposium on Autonomous Underwater Vehicle Techology, Jun. 2–3, 1992, Washington, DC, USA.

Gerard Loubet, et al. Parametric Transmission of Wide–bank Sigals, IEEE, Aug. 1996, p. 839–844.

D. Thompson, et al. Performance of Coherent PSK Receivers using Adaptive Combining, Beamforming and Equalisation in 50Km Underwater Acoustic Channels, IEEE, Aug. 1996, pp. 845–850.

(List continued on next page.)

*Primary Examiner*—Ian J. Lobo
*Attorney, Agent, or Firm*—Stroock & Stroock & Lavan LLP

[57] ABSTRACT

A personal underwater communication device which comprises: A display; A memory unit for storing a plurality of preset messages, each message being assigned a common message identification code; Means for assigning a unique identification code to each personal device; Means for selecting one of said preset messages, to be transmitted to a receiving device; Means for selecting one or more receiving devices to which a message is to be transmitted; Means for producing a string encoding said message identification code and the identification code of the transmitting device; Means for modulating said string with at least one ultrasound acoustic modulating frequency, thereby to produce a modulated signal; Means for transmitting said modulated signal in water; Means in each device for receiving transmitted ultrasound acoustic modulated signals; Means for demodulating modulated signals which are received by said device, thereby to produce a demodulated string; Means for decoding a message from said demodulated string; and Means for displaying on the display of the receiving device the received message and the identification code of the transmitting device.

45 Claims, 9 Drawing Sheets

OTHER PUBLICATIONS

Eie Bejjani et al. Multicarrier Coherent Communications for the Underwater Acoustic Channel, IEEE, Aug. 1996, pp. 1125–1130.

Adam Zielinski et al. "Performance Analysis of Digital Acoustic Communication in a Shallow Water Channel", IEEE Journal of Oceanic Engineering, vol. 20, No. 4, Oct. 1995, pp. 293–299.

Cassio Kuchpil et al., "Autonomous Control System for Offshore Oil Explotation using Digital Acoustic Communication", IEEE, Feb. 1997, pp. 849–853.

Doris Carvalho et al, "The Results of Several Acoustic Telemetry Tests in Both Shallow and Deep Water", pp. 604–614.

Milica Stojanovic, "Phase–Coherent Digital Communications for oUnderwater Acoustic Channels", IEEE Journal of Oceanic Engineering, vol. 19, No. 1, Jan. 1994, pp. 100–111.

R. Coates, "Underwater Acoustic Communications", IEEE, Feb. 1993, pp. III–420–424.

UNDERWATER COMMUNICATION APPARATUS AND COMMUNICATION METHOD

FIELD OF THE INVENTION

The field of the invention relates to systems for underwater communication. More particularly, the invention relates to a method for underwater communication, to an underwater communication network of several personal devices, in which each device holder can send or receive a message to or from any one or more device holders in the network, or can communicate with a base station.

BACKGROUND OF THE INVENTION

Performing reliable underwater communication is relatively complicated. It is known that electromagnetic waves significantly attenuate when propagating through water. Practically the only frequency band that is used for underwater electromagnetic communication is the VLF (Very Low Frequency) range, in the range of up to 10 kHz. In this range, the transmission needs high power, and use of extremely long antennas are required. Therefore, such use is generally limited to submarine communications and cannot be applied for personal use. For short range underwater communication, conventional systems apply ultrasound acoustic waves, generally in the frequency range of 20 kHz–600 kHz. However, unfortunately, in the acoustic frequency range, the communication channel is limited to a relatively narrow bandwidth, which in turn limits the speed of the data transfer. The ability to reliably transfer data through water with acoustic waves is further harmed due to the non-linear speed of sound in water, different layers of water density, multipath of the propagation of the signal, fading and other environmental disturbances. Therefore, due to the abovementioned problems, many types of air communication systems are not applicable underwater.

Furthermore, most, if not all, of the currently existing systems for underwater communication employ analog modulation, a type of modulation which has been found inefficient for underwater network applications. For example, there exist underwater communication devices, such as the MKII by OTS company of Costa Mesa, Calif., which transmit vocal communication between divers, and are based on the transmission of ultrasound acoustic waves SSB modulated, generally in the range of 32–40 kHz. U.S. Pat. No. 4,563,758 discloses an underwater communicator device which permits acoustic communication between two divers by use of voice synthesizer. U.S. Pat. No. 5,523,982 also discloses a diver to diver communication apparatus which includes means for transferring messages between two divers, the messages determined by their audible tone or duration. The device further includes a flashing beacon for indicating the location of a diver in an emergency situation. CA 2,141,619 also discloses a device for transferring a message, amplitude modulated between two divers. The receiving device then emits an audible message that the diver carrying the receiving device can easily hear.

All the said devices and others enable communication between two divers being only in a relatively close range, generally in the range of less than 150 meters, and require a "line of sight" between the transmitting and receiving devices. They do not provide means for carrying out reliable underwater communication between any two or more divers or devices in a network, that may be located several kilometers away from one another, and lack a "line of sight".

Besides the abovementioned voice devices, there is no known reliable system which provides communication between divers, or more specifically, a paging system for transferring personal messages in a network of two or more divers.

It is therefore an object of the invention to provide a method for carrying out a reliable underwater communication.

It is another object of the invention to provide a low power underwater communication with a relatively long range.

It is still another object of the invention to provide a low power and reliable underwater communication between two devices lacking a "line of sight".

It is still another object of the invention to provide an underwater-dialing network in which communication can be carried out between any two or more members in the network.

It is still another object of the invention to provide an underwater paging network for transferring messages between divers.

It is still another object of the invention to provide a personal, low-power and lightweight device, capable of receiving, displaying, and transmitting messages to or from other users underwater.

It is still another object of the invention to provide means for transferring emergency messages to or from one or more divers.

It is still another object of the invention to provide underwater communication means which do not require full mask equipment.

Other purposes and advantages of the invention will become apparent when the description proceeds.

SUMMARY OF THE INVENTION

The invention relates to a method, apparatus, and network for carrying out underwater communication. More particularly, the invention provides means for transferring messages between several users, wherein at least some of them are located underwater.

The personal underwater communication device, according to one embodiment of the invention, comprises a display, a memory unit for storing a plurality of preset messages, each message being assigned a common message identification code (i.e., the same messages are assigned the same message identification code in all personal devices of the same network), means for assigning a unique device identification code to each personal device, means for selecting one of said preset messages to be transmitted to a receiving device, means for selecting one or more receiving devices to which a message is to be transmitted, means for producing a string encoding a message identification code and the device identification code of the transmitting device, means for modulating said string with at least one ultrasound acoustic modulating frequency thereby to produce a modulated signal, means for transmitting said modulated signal in water, means in each device for receiving said transmitted ultrasound acoustic modulated signals, means for demodulating modulated signals which are received by said device, thereby to produce a demodulated string, means for decoding a message from said demodulated string, and means for displaying on the display of the receiving device the received message. Preferably, the device further comprises means for alerting that a new message has been received and displayed.

According to one embodiment of the invention, the modulating means of the personal underwater communication device, binary-FSK, modulates the said string with a pair of acoustic ultrasound frequencies, a first frequency of said pair for indicating a "1" level of the string, and a second frequency of said pair for indicating a "0" level of the string, the said pair of frequencies being the frequencies assigned as the receiving frequencies of the device to which the message is to be sent. Generally, the said acoustic ultrasound frequencies are frequencies in the range of up to 200 kHz, however, even higher frequencies can be used, up to 600 kHz. For networks of a small number of users, a range of up to 60 kHz is generally preferable.

Preferably, in order to carry out the communication between the personal underwater communication devices according to the invention, each personal device comprises means for selecting any one of a plurality of pairs of ultrasound- frequencies for transmitting, which pair of ultrasound frequencies is assigned to one of a plurality of receiving devices. The selected pair of frequencies is the pair of frequencies assigned as the receiving frequencies of the specific device to which the message is sent.

According to another preferred embodiment of the invention, the modulating means in each personal underwater communication device, binary-FSK, modulates with diversity the string with at least two pairs of acoustic ultrasound frequencies, a first frequency of each pair for indicating a "1" level of the string, and a second frequency of each pair for indicating a "0" level of the string, said at least two pairs of frequencies matching the at least two pairs of frequencies assigned as the receiving frequencies of the specific device to which the message is to be sent, thereby to produce a modulated signal.

Preferably, a diversion is provided between a pair of frequencies for indicating "1" or "0" levels of said string from the at least one additional pair of frequencies for indicating the same "1" or "0" levels of said string, the diversion between the two pairs of frequencies being preferably 10 times or more the difference between the frequencies for indicating "1" or "0" levels in the same pair. Preferably, the diversion is in the range of between 1 kHz to 200 kHz.

The receiving means, according to a preferred embodiment of the invention, comprise a hydrophone for sensing an acoustic modulated ultrasound signal, a pre-amplifier for amplifying the sensed modulated ultrasound signal, a frequency shifter for passing only frequencies which are assigned to said device and for converting said passed frequencies to low frequency components, and low pass filtering means for passing only said low frequency components. The means for demodulating comprise analog to digital means for separately converting each passed low frequency component to a digital value, a first circuitry for adding digital values resulting from frequencies indicating a "1" level, and a second circuitry for adding digital values resulting from frequencies indicating a "0" level, and logic means for comparing the results from said first and second circuitries to determine whether a "1" or "0" bit is received.

According to a preferred embodiment of the invention, each personal underwater communication device is further provided with means for transmitting emergency (SOS) signals, means for receiving emergency (SOS) signals, and means for alerting that an emergency signal has been received.

Preferably, the means for transmitting emergency signals comprise means for producing a string encoding an emergency message and the identification code of the transmitting device, and means for modulating said string with at least one ultrasound acoustic modulating frequency which is characteristic of emergency situations, thereby to produce a modulated emergency signal.

Preferably, the means in each device for receiving emergency (SOS) signals comprise means for receiving ultrasound acoustic modulated emergency signals in the at least one frequency which is characteristic of emergency situations, and means for demodulating said modulated emergency signals which are received by the device, thereby to produce a demodulated emergency string.

Preferably, the preset messages in each underwater device further comprise among the preset messages a message for instructing a receiving device to transmit its SOS (emergency) message and each receiving device also comprises means for initiating transmission of its SOS (emergency) message upon receipt of said message instructing it to transmit the SOS (emergency) message.

The invention further relates to an underwater communication network system which comprises a plurality of personal devices. Each network may further include at least one relay apparatus. Furthermore, each underwater communication network system may include one or more base stations.

Preferably, each relay apparatus of the underwater communication network system is an acoustic to acoustic apparatus provided with means for receiving an underwater ultrasound acoustic modulated signal, means for amplifying the same, and means for retransmitting said amplified modulated signal. Each relay apparatus may also comprise means for receiving a message transmitted by wire or wireless means from an out of water source, means for converting said message to ultrasound acoustic modulated signals, and means for transmitting the same to an underwater personal device, or to another relay apparatus or vice versa. In such a case, in order also to provide communication between an underwater user and another unit out of water, each relay apparatus comprises means for receiving an ultrasound acoustic modulated signal sent by an underwater personal device, means for converting said signal to an electromagnetic signal, and means for transmitting the same to an out of water unit by any conventional means.

Preferably, each base station of the underwater communication network system is an electromagnetic to acoustic to apparatus provided with means for receiving messages from any out of water source and for transmitting the same to underwater personal devices or relay apparatus, and with means for receiving a message from an underwater personal device or relay apparatus, and for transmitting the same to an out of water device.

A method for transmitting underwater messages, comprising the steps of:

1) Providing at least one transmitting device and at least one receiving device;
2) Assigning to each transmitting device an identification code;
3) Assigning to each receiving device at least two pairs of acoustic ultrasound frequencies, a first frequency of each pair for indicating a "1" level, and a second frequency of each pair for indicating a "0" level; and
4) At the transmitting device:
   (a) Encoding a binary string containing a message, a transmitting device identification code, and optionally, any other desired information;
   (b) Modulating the said string with said at least two pairs of acoustic ultrasound frequencies, which are identical to the at least two pairs of frequencies assigned as the receiving frequencies of the specific device to which the message is to be sent, thereby producing a modulated signal;

(c) Tuning the transmitting device to receive signals in the at least two pairs of frequencies assigned as the receiving frequencies of the specific device to which the message is to be sent;

(d) If no signal is received in a frequency comprised in said at least two pairs of acoustic ultrasound frequencies corresponding to said specific device, assuming that the receiving device is ready to receive signals and transmitting said modulated signal by means for transmitting underwater ultrasound acoustic waves; and (e) If a signal is received, assuming that the receiving device is busy in receiving another signal, and postponing the transmission of the modulated signal;

5) At the receiving device:

(a) Receiving said modulated signal by means suitable for receiving underwater ultrasound acoustic waves;

(b) Providing means for demodulating said received modulated signal, thereby decoding a string;

(c) Determining from said string the message, the ID of the transmitting device, and optionally any other information encoded in said string;

(d) Encoding a binary string containing an acknowledgment message, the said receiving device identification code, and optionally, any other desired information;

(e) Modulating the said string with the at least two pairs of acoustic ultrasound frequencies, which are identical to the at least two pairs of frequencies assigned as the receiving frequencies of the said transmitting device, thereby producing a modulated acknowledgment signal; and (f) Transmitting said modulated acknowledgment signal by means for transmitting underwater ultrasound acoustic waves.

According to the above method, each one of said transmitting or receiving devices is both a transmitting and receiving device. Preferably, the modulation of the string at the transmitting device is Binary-FSK modulation and the demodulation at the receiving device is Binary-FSK demodulation. More preferably, the modulation of the string at the transmitting device is Binary-FSK modulation with diversity and the demodulation at the receiving device is Binary-FSK demodulation with diversity. In the latter case, when a plurality of pairs of frequencies are assigned to a receiving device, each pair of frequencies is separated from another pair of frequencies by a frequency of between 1 kHz to 200 kHz.

Preferably, according to one embodiment of the invention, the means for receiving and the means for transmitting said underwater ultrasound acoustic waves is a hydrophone.

DETAILED DESCRIPTION OF PREFERRED EMBODIMENTS

Figure 1:
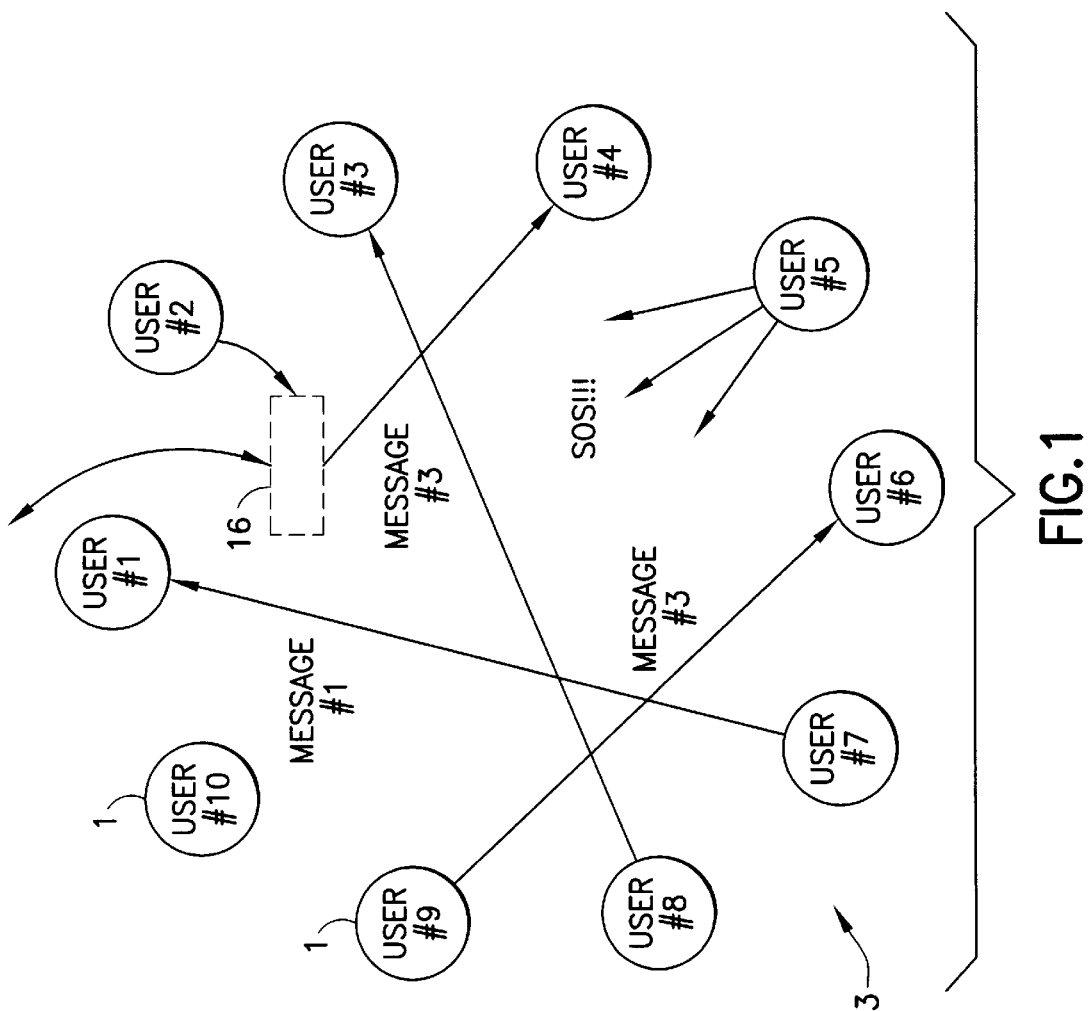
FIG. 1 shows an exemplary of an underwater communication network according to one embodiment of the invention.
Figure 2:
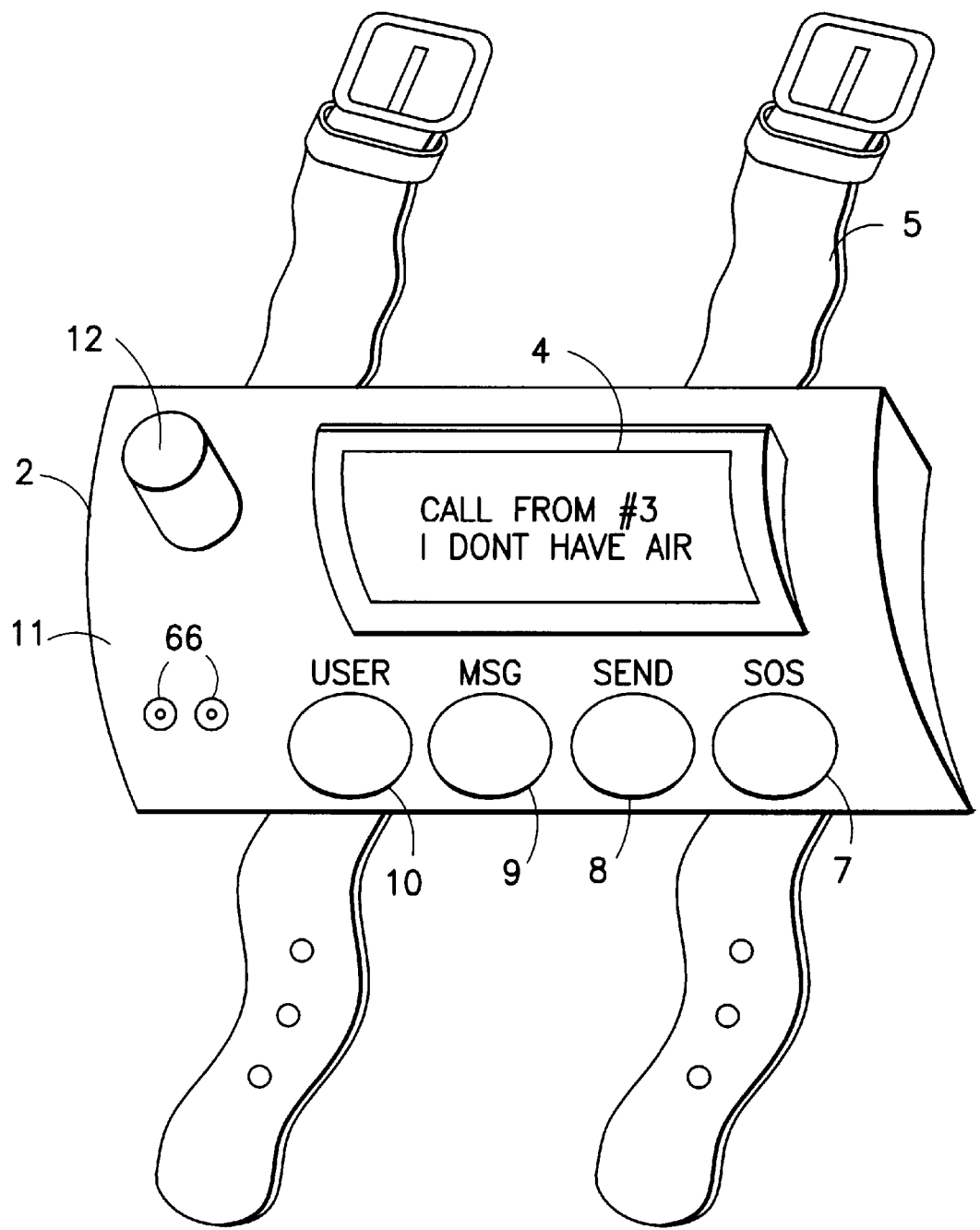
FIG. 2 shows an overview of a personal device according to one embodiment of the invention.

A system and network for transferring underwater messages between any two or more personal devices (hereinafter also referred to as "beepers" or "underwater beepers") is shown in FIG. 1. As shown, the network 3 comprises a plurality of personal devices, which are provided, each one to a user (hereinafter also referred to as "member") 1 in the network. According to one embodiment of the invention, each member is provided with a personal device 2, such as the one shown in FIG. 2.

According to one embodiment of the invention, each personal device 2, which is intended to be carried by a diver, is provided with a liquid crystal display (LCD) 4, for displaying alpha-numeric messages. The device further comprises a keyboard, or plurality of push-buttons, such as buttons SOS 7, SEND 8, MSG 9, and USER 10, which are mounted on the body 11 of the device. The device further comprises a hydrophone 12, and means, such as belts 5, for attaching the device to the diver's hand, to another part of his body, his diving suit, or his equipment, as is convenient.

Each one of said personal devices is able, according to the invention, to communicate directly with any other member or members of the same network or with members of other networks. A relay apparatus 16 (optional) may receive a signal, amplify it, and retransmit it in order to enable communication of a longer range with members of the same network, or members of other networks. Each personal device is of course also provided with batteries for supplying power to the unit. Said batteries may be either in the case of the device or external to the device.

Figure 3:
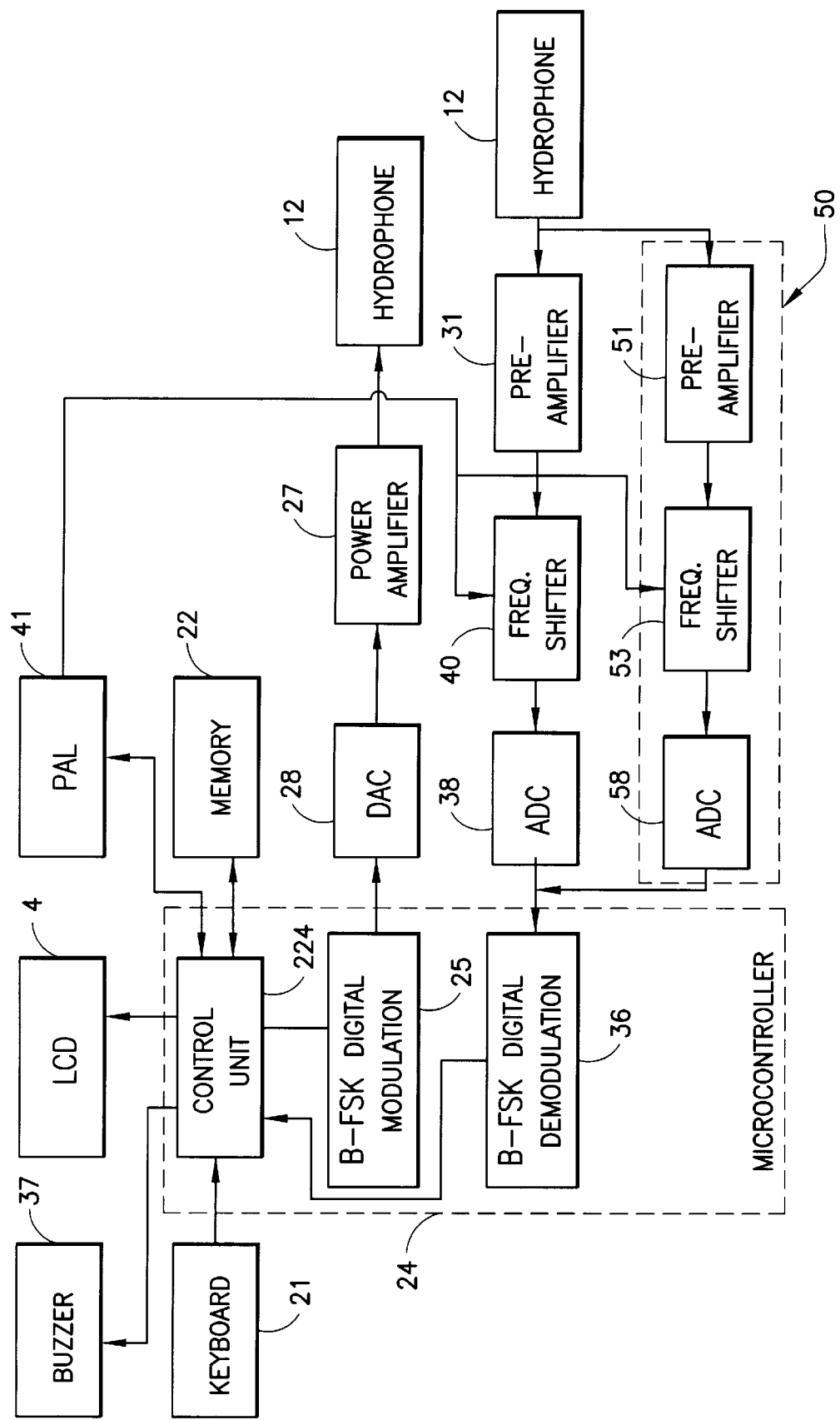
FIG. 3 shows in block diagram form the internal structure of a personal device according to one embodiment of the invention.

FIG. 3 shows, in block diagram form, the internal structure of a personal device according to one embodiment of the invention. Microcontroller 24 regulates the operation of the device and provides necessary signals to other units of the system. Keyboard 21 comprises several keys, which are basically used for initializing the device, for defining each personal device in the network by assigning to it an identification code, for introducing a specific message to the device, for selecting for transmission one from several messages stored in the memory unit 22, for selecting the addressee identification code, etc. (The term "addressee", when used herein, generally refers to the device or user of a device to whom a message is sent). The memory unit 22 is used for storing the software needed for the operation of the device, a plurality of preset messages for transmission, and optionally some instructive messages for helping the user operate the device. The Liquid Crystal Display (LCD) 4 is used for displaying messages, addressee or sender identification codes, or other instructive messages to the user of the device.

According to some variations of the invention, the LCD may be a graphic & alpha-numeric display for displaying both signs and alpha-numeric messages. The pushbuttons may be piezo-electric buttons. The device may further comprise an ON-OFF switch 66 (shown in FIG. 2), which is of the water activated type, i.e., activated automatically when the device enters water. The device may also automatically turn OFF several minutes after being removed from water.

When it is desired to use the device, the user has to first initialize the device by assigning to it an identification code, and by introducing it to the network. This initialization procedure is generally performed only once. Then, the device is active and ready for operation underwater. When the user of the device wishes to send a message to another user, he has to use the keyboard 21 in order to sequentially display on LCD 4 messages which are stored in the memory 22, to select one relevant message and addressee identification code, and then to push a suitable button of the keyboard, such as button 8 of FIG. 2, which is assigned as the SEND button.

The message is then modulated by a binary-FSK (also referred to as "B-FSK") modulator 25 with diversity. The modulator 25 converts the message into a binary sequence. The diversity is obtained by using a total of four (tetrad) frequencies, two for representing the "0" level and two for representing the "1" level of the binary sequence, instead of a total of two frequencies, as is generally used with conventional binary-FSK. In other words, each message signal is simultaneously transmitted, in two frequency bands. For example, frequencies $f_0^{(1)}(i)$ and $f_0^{(2)}(i)$ are transmitted for a "0" in the message, and $f_1^{(1)}(i)$ and $f_1^{(2)}(i)$ are simultaneously transmitted for a "1" in the message, (i) denotes the user number in the network, the subscript indicates whether the frequency relates to "0" or "1" level, and the superscript indicates whether the frequency is the first or second of the two frequencies assigned to the indicated level. Therefore, actually two communication bands are assigned for each user, one including $f_0^{(1)}(i)$ and $f_1^{(1)}(i)$, and the second including $f_0^{(2)}(i)$ and $f_1^{(2)}(i)$. In other words, each user is assigned with a tetrad (four) of frequencies. The space between the two bands which are assigned for a same user is designated as ΔF.

According to one embodiment of the invention, the space between the assigned frequencies for "0" and "1" levels in one band, Δf, is about 180 Hz, i.e., the following is assumed:

$$\Delta f = f_1^{(1)}(i) - f_0^{(1)}(i) = f_1^{(2)}(i) - f_0^{(2)}(i) = f_1^{(1)}(i+1) - f_0^{(1)}(i) = f_1^{(2)}(i+1) - f_0^{(2)}(i) = 180 \text{ Hz}.$$

The space between the two bands which are assigned for any one user is:

$$\Delta F = f_0^{(2)}(i) - f_0^{(1)}(i) = f_1^{(2)}(i) - f_1^{(1)}(i) = 6.25 \text{ kHz, for all i}.$$

The base frequency, i.e., the lowest transmitted frequency, is $FB_1$=43.75 kHz.

Figure 4:
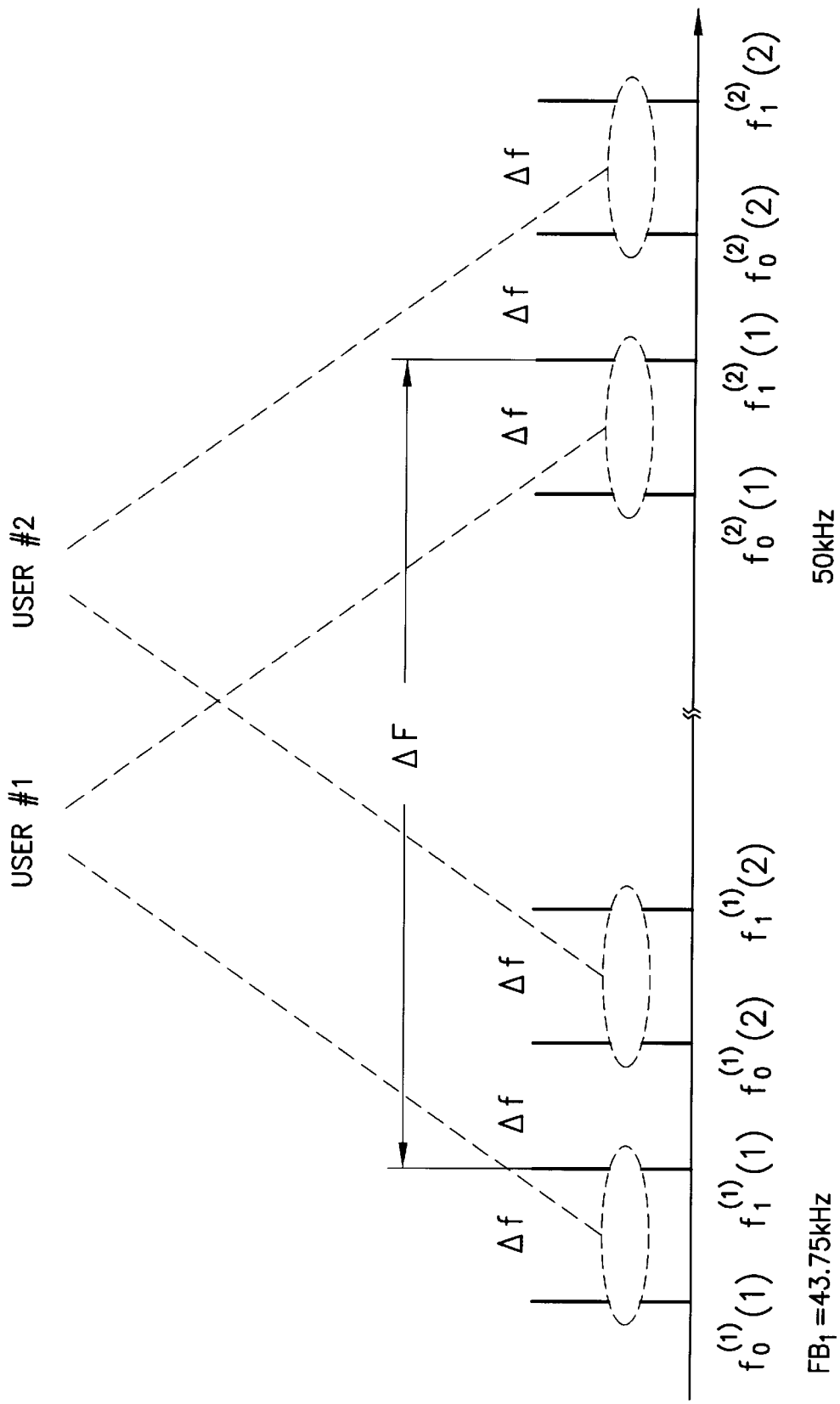
FIG. 4 shows an exemplary assignment of frequencies to personal devices in a network according to one embodiment of the invention.

FIG. 4 illustrates the assignment of frequencies in a network as described above.

Each network generally comprises a plurality of users K, for example, about 10–20, but more or fewer users may be included in one network, if necessary. Furthermore, several networks can operate in a common location, i.e., within overlapping range, however, in order to prevent misdirection of messages, it is desired that in an overlapping range two devices (that may belong to two separate networks) would not be assigned the same tetrads of frequencies, or would not even be assigned the same part of a tetrad of frequencies. If, for example, it is desired to operate $N_{net}$ networks in one area, or within overlapping range, the number of tetrads should be $N_{tot}=(K+1)N_{net}$. It should be noted that the number of tetrads in each network is generally K+1, as one tetrad is assigned for emergency (SOS) purposes, as hereinafter explained in more detail. Of course, if the SOS tetrad of frequencies is common in all said networks working in an overlapping range, the number of tetrads can be reduced to $N_{tot}=(K)N_{net}+1$. Therefore, the base frequency for network n, should be: $FB_n=FB_1+2(n-1)(K+1)\Delta f$. It should be noted that the above calculations relate to networks which intend to operate in overlapping range. Otherwise, of course, when working in a non-overlapping range, different networks may use tetrads of overlapping frequencies. Furthermore, if several networks are operative in the same area, and two personal devices are assigned with the same tetrad of frequencies, still, determination as to which of the said two devices a message is sent can be carried out by the content of the received signal, as each transmitted signal contains information regarding the network identification code, as will be further elaborated when the description proceeds.

From the binary-FSK digital modulator 25, a sequence of binary numbers, relating to the whole message to be transmitted, is sequentially transferred to a Digital to Analog Converter (DAC) 28, which converts the sequence of numbers to a modulated signal. Then, the signal is amplified by Power Amplifier 27, and is transmitted to the personal device of the addressee, as selected, by hydrophone 12, which is adapted to transmit ultrasound acoustic signals.

When a signal is received by hydrophone 12 of the addressee personal device, it is first amplified by pre-amplifier (31), which particularly amplifies weak received signals, and is provided to a frequency shifter unit 40. The frequency shifter unit receives a signal which is combined from two frequency components, $fx^{(1)}(i)$ and $fx^{(2)}(i)$, wherein x may be either "1" or "0". The frequency shifter utilizes the two frequency components to better distinguish whether a signal for a "0" or "1" is received, and particularly to overcome noise. It provides to the Analog to Digital Converter 38 (ADC) a signal with a suitable voltage level. The Analog to Digital Converter 38 then converts the analog signal to a sequence of bits, which are transferred to the binary-FSK Demodulator 36, which in turn performs an opposite operation to the operation of the abovementioned modulator 25. The resulting output of the demodulator 36 is therefore a copy of the message, as provided to the modulator 25 of the transmitting personal device. The output sequence from the demodulator 36 is provided to the control unit 224, which converts it, and sends it in a suitable form to the LCD 4 for display. Simultaneously, an indication, such as buzzer 37, is activated, to notify the user of the receiving device that a message has been received. The indicator can be of different types, well known in the art, for example, a waterproof buzzer, as sound propagates in water, or vibrating means.

It should be noted here that the control unit, as well as the Modulator 25 and Demodulator 36 units, are embodied according to one embodiment of the invention by a microcontroller, such as INTEL 80C51, Motorola 68HC11, or DSPs and others. The software associated with the device is within the scope of those skilled in the art, and will not be given here for the purpose of brevity. Of course, the said units can also be carried into practice by using different equivalent or non-equivalent components.

Figure 5:
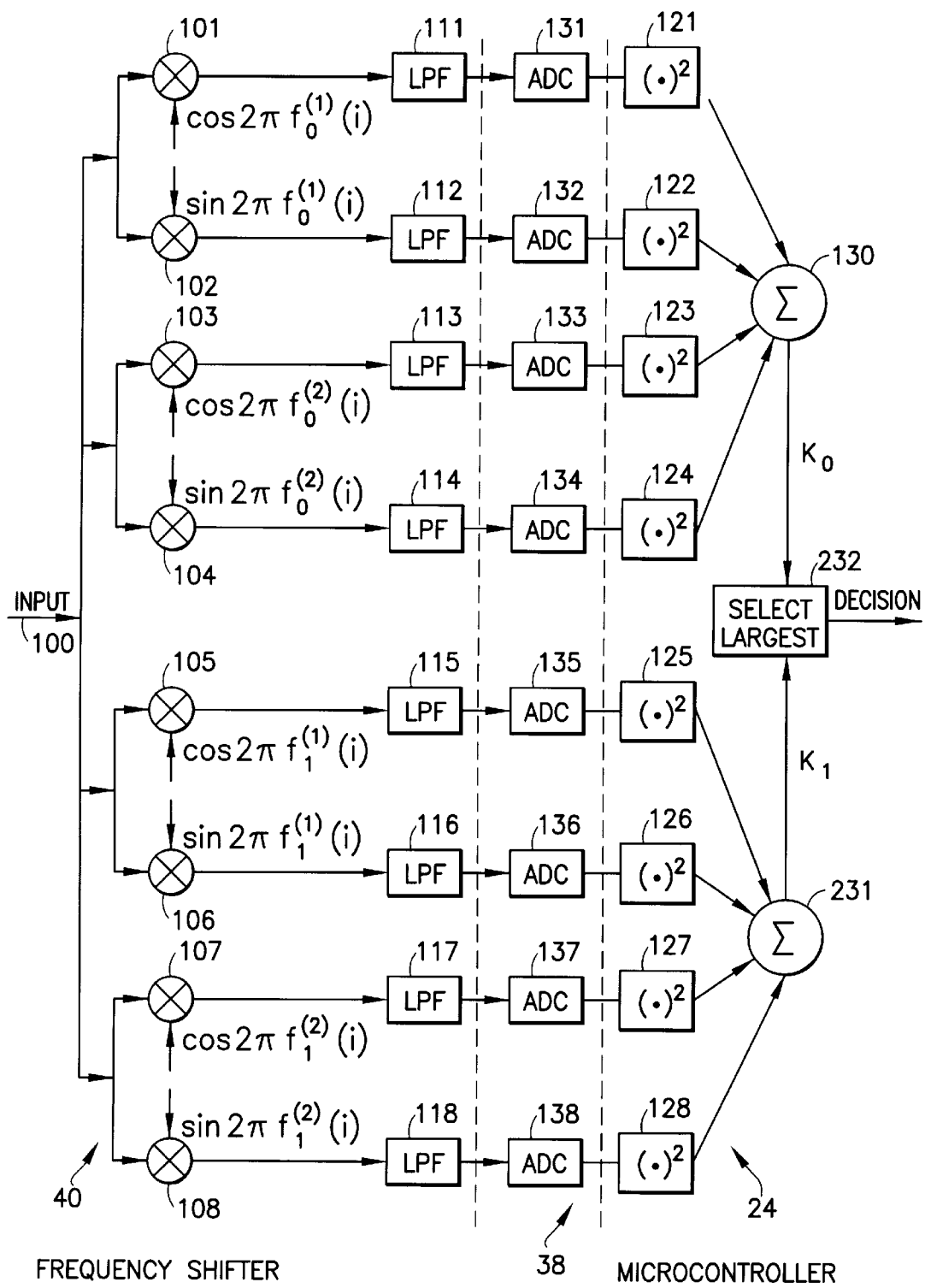
FIG. 5 shows in block diagram form the receiving and demodulating of a signal by a binary-FSK demodulator with diversity according to one embodiment of the invention.

FIG. 5 shows in more detail the means for detecting and demodulating the received signal. As said, a signal which consists of two frequency components, $fx^{(1)}(i)$ and $fx^{(2)}(i)$ is provided to the input of the frequency shifter 40. The frequency shifter 40 is implemented using an analog hardware technology while the FSK demodulator 36 is implemented in software within the microcontroller. Each Low Pass Filter (LPF) 110–118 has a cut-off frequency less than Df, which according to one embodiment of the invention equals 180 Hz. The support frequencies $[f_0^{(2)}(i), f_0^{(1)}(i), f_1^{(2)}(i), f_1^{(1)}(i)]$ to the multipliers are provided by a frequency synthesizer which is implemented by the microcontroller in conjunction with a PAL 41 (shown in FIG. 3). Assuming that a "0" bit is currently sent by another device to the personal device of user #i, i.e., a signal x(t) of the form $$x_{in}(t) = A_1 \cos(2\pi f_0^{(1)} t + \phi_1) + A_2 \cos(2\pi f_0^{(2)} t + \phi_2) + n(t)$$

appears at the input 100 of the scheme of FIG. 5. $A_1$ and $A_2$ are unknown amplitudes, $\phi_1$ and $\phi_2$ are unknown phases and n(t) is the channel noise. Note that the signal at the output of the transmitter has the following form $$x_{trans}(t) = A \cos(2\pi f_0^{(1)} t) + A \cos(2\pi f_0^{(2)} t)$$

and the changes in the amplitudes and phases are due to the channel. Without losing generality, the following analysis will assume that noise does not exist, however, it does not mean that the scheme does not work in noise; this scheme very effectively overcomes noise and eliminates other disturbances. The input signal 100 is split and separately inputted to multipliers 101–108, which as said, receive also sine and cosine signals from PAL 41. The resulting signals, due to the multiplications performed by multipliers 101-108, are as follows:

$0.5A_1 \cos\phi_1$(+ components of frequencies larger than Df=180 Hz) at the output of multiplier 101;

$-0.5A_1 \sin\phi_1$(+ components of frequencies larger than Df=-180 Hz) at the output of multiplier 102;

$0.5A_2 \cos\phi_2$(+ components of frequencies larger than Df=180 Hz) at the output of multiplier 103;

$-0.5A_2 \sin\phi_2$(+ components of frequencies larger than Df=180 Hz) at the output of multiplier 104;

components of frequencies larger than Df=180 Hz at the output of multiplier 105;

components of frequencies larger than Df=180 Hz at the output of multiplier 106;

components of frequencies larger than Df=180 Hz at the output of multiplier 107;

components of frequencies larger than Df=180 Hz at the output of multiplier 108.

The Low Pass Filters 111–118 allow only components of under 180 Hz to pass therethrough, and block components of frequencies above 180 Hz. Therefore, at the outputs of Low Pass Filters 111–118, the following signals result:

$0.5A_1 \cos\phi_1$ at the output of LPF 111;

$-0.5A_1 \sin\phi_1$ at the output of LPF 112;

$0.5A_2 \cos\phi_2$ at the output of LPF 113;

$-0.5A_2 \sin\phi_2$ at the output of LPF 114;

zero signal at the output of LPF 115;

zero signal at the output of LPF 116;

zero signal at the output of LPF 117;

zero signal at the output of LPF 118;

Each one of the aforesaid signals at the eight outputs of Low Pass Filters 111–118 is then separately converted by Analog to Digital Converters (ADC) 131–138 (all of said ADCs are schematically indicated as block 38) to eight digital values, which are provided to the microcontroller 24, which in turn separately squares the said digital values by squaring blocks 121–128, respectively. Then, the four squared values from the output of the squaring blocks 121–124 are summed by summing block 130, and the four squared values from the output of squaring blocks 125–128 are summed by summing block 131. Therefore, the binary value $K_0 = 0.25a(A_1^2 + A_2^2)$ is obtained at the output of the summing block 130, and the binary value $K_1 = 0$ is obtained from summing block 131. The values $K_0$ and $K_1$ are compared by unit 132. If the binary value $K_0$ is larger than the value of $K_1$, then it is assumed that a "0" bit is received, and otherwise, it is assumed that a "1" is received.

Figure 7:
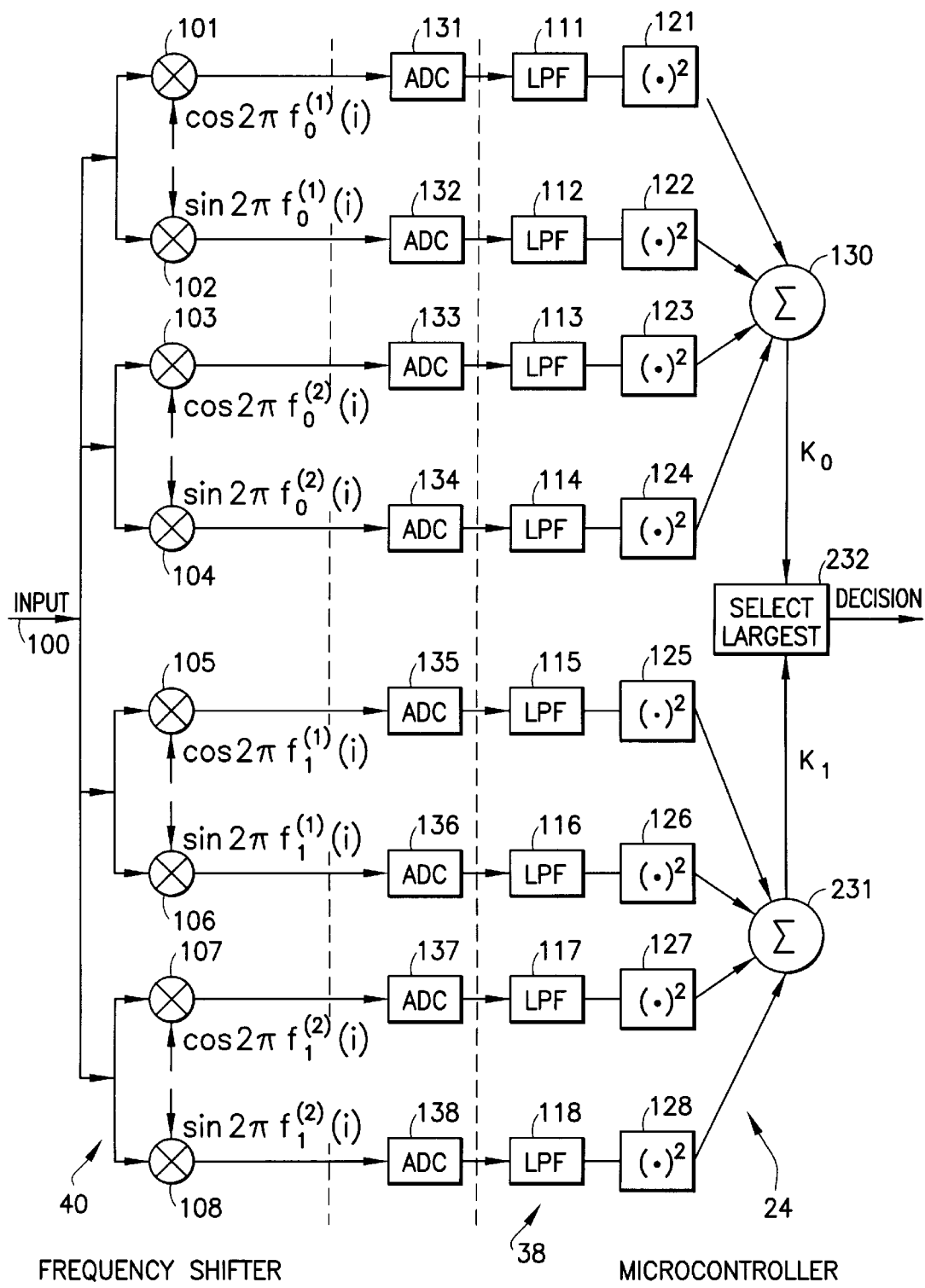
FIG. 7 shows in block diagram form the receiving and demodulating of a signal by a binary-FSK demodulator with diversity according to an embodiment of the invention the different from what is shown in FIG. 5.
Figure 8:
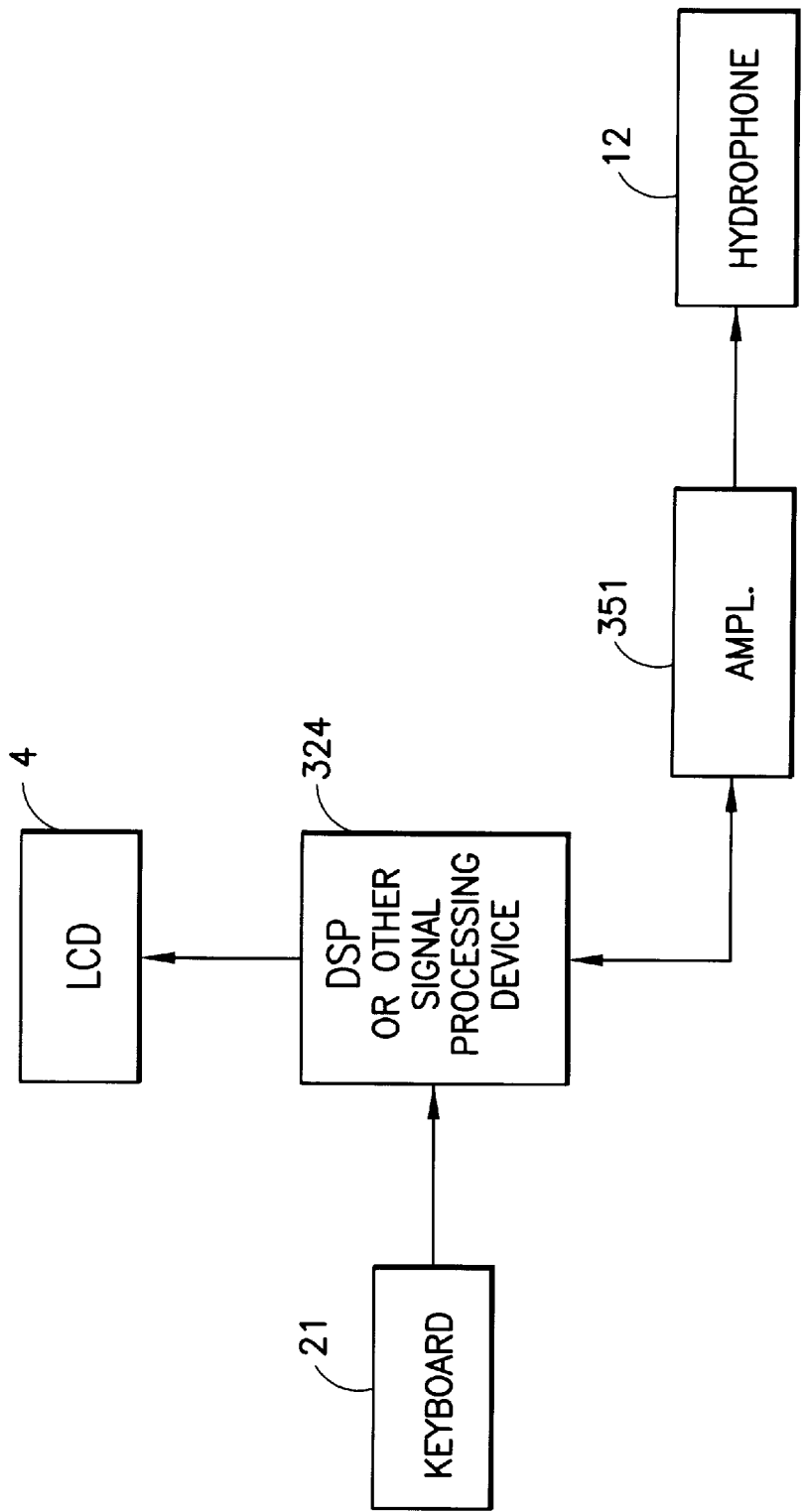
FIG. 8 shows in principle block diagram form the structure of a personal device according to an embodiment of the invention different from what is shown in FIG. 3.

It should be noted that the scheme of FIG. 5 is a principle scheme that relates to the case in which a tetrad of frequencies (with diversity) is assigned to each device. Of course, if more than four frequencies are to be assigned to each device, i.e., each transmitted message is modulated by more, diverse pairs of frequencies, the scheme of FIG. 5 should be expanded accordingly. Furthermore, in a practical embodiment of the invention, several equivalents can be used. For example, instead of PAL (Programmable Array Logic), an FPGA (Field Programmable Gate Array) is used. The plurality of Low Pass Filters shown in FIG. 5 are digitally embodied by the microprocessor, and moreover, there is no need for eight Analog to Digital Converters, but a same Analog to Digital Converter can be used: by using a multiplexer, in ways well known in the art. FIG. 7 shows a scheme equivalent to that of FIG. 5, in which the digital Low Pass Filter is embodied by the microcontroller 24. The use of a microprocessor or microcontroller is also not a necessity in the device, but optional. FIG. 8 shows a principle scheme of a device in which, instead of a microcontroller, a DSP (Digital Signal Processor), or other signal processing means can be used. Amplifier 351 is equivalent to the two preamplifiers 31 and 51 shown in FIG. 3.

As shown in FIG. 1, each one of the members of network 3 can transmit a message to any other member which belongs to his network. In order to transmit a message, the user should select the identification code of the member to whom he desires to send the message, and a message, out of the several preset messages stored in the memory. Then, when the message is selected, the sender should push the button SEND of his device. Next, before transmitting the message, the device switches to a listening mode in which it listens to the channel of the addressee member, and checks whether the channel is free or occupied by another transmission. If it is not occupied, the transmission of the message is carried out. If, however, the channel of the addressee is occupied, the transmission is delayed. It should be noted here that when the sending member selects the identification code of the receiving device, the sending device transmits the message in the frequency tetrad of the receiving device, and therefore, the sending device actually adapts its transmission to the tetrad of frequencies of the receiving device. During the listening mode (before transmission), on the other hand, the transmitting device adapts itself to receive signals in the tetrad of frequencies of the receiving device. The receiving device listens only to the tetrad assigned to it when it is waiting for messages. Therefore, it is clear that each device should be capable of transmitting or receiving in any of the tetrads of frequencies of all the devices of the network. However, this is simple to apply, as any desired tetrad of frequencies can be generated by the PAL unit (or the DSP, if used instead of the microcontroller). It should be noted here that this -implementation allows a simultaneous communication between pairs of a plurality of users. For example, as shown in FIG. 1, user 7 may send a message #1 to user 1, and simultaneously, user 9 may send a message to user 6. This is possible, as each transmission uses a different tetrad of frequencies.

According to a preferred embodiment of the invention, all the devices of a single network contain the same preset messages and each message is designated the same code in all the devices. If, for example, the message "CHECK AIR LIMIT" is designated as message #10 in all the devices of a network, and a user of device #4 wants to transmit to device #2 this message, the device #4 actually tunes itself first to listen to the channel of device #2 (in the listening mode), and if said channel of device #2 is free, it tunes to transmit a code "#10" in the tetrad of device #2. When device #2 receives the said code "#10", it simply displays the message relating to code #10 on the display, wherein said message is, of course, "CHECK AIR LIMIT". Furthermore, knowing the code of the device which sent the message, the receiving device then transmits an acknowledgment message to the transmitting device, of course in the tetrad of frequencies of the transmitting device. Then the transmitting device receives the acknowledgment message, a message such as "CALL FROM #2 ACKNOWLEDGE", wherein X indicates the receiving device identification code, and Y indicates the message#. It should be noted that in additional to the preset messages, each device also contains some "service messages" that are generally not accessible by the user for transmission. Such messages are, for example, messages for assisting the user in operating the device, the acknowledgment message which is transmitted automatically by the device upon receiving a message, and a message notifying that the device is in communication with an external device (such as a PC), for loading messages of modifying its software.

According to another embodiment of the invention, the complete ASCII code of the message "CHECK AIR LIMIT" can be transmitted. Of course, this means of transmission is less efficient, as it requires the sending of longer messages. On the other hand, it may enable the sending of any message according to one embodiment of the invention, as the sender desires. In this case, the memory unit contains all ASCII symbols and optionally some graphic signs, and each symbol is treated as a message, as before.

According to one embodiment of the invention, the following 10 messages are preset and assigned in each personal device, as follows:

1. I'M IN TROUBLE;
2. EVERYTHING IS OK;
3. PAY ATTENTION;
4. STOP;
5. FOLLOW ME;
6. LETS GO UP;
7. LETS GO DEEPER;
8. HALF TANK;
9. I DON'T HAVE AIR;
10. CHECK AIR LIMIT.

Of course, additional service messages are generally preset in the device, but those will not be given here for purposes of brevity. Moreover, according to a preferred embodiment of the invention, each device also includes a dedicated port for connecting to an external PC for loading new messages, and/or for replacing existing messages, or even for replacing or updating the complete software of the device.

It is known that usually divers dive in pairs or groups, for purposes of safety. Generally, for each diver it is common to assign a partner, usually called a "buddy", which is supposed to be the closest to the diver, to assist him when needed. The device according to one embodiment of the invention therefore optionally also includes means for simplifying the transmission of messages to a default buddy, as defined in the device prior to entering the water.

According to a preferred embodiment of the invention, the network also comprises means for transferring an SOS (emergency) message from one member to all other members in the network. Therefore, in addition to the tetrads of frequencies which are assigned to the members of the network, one special tetrad of frequencies is assigned for the transfer of an emergency, SOS message from one user to all the other users. Each device, according to one embodiment of the invention, comprises an additional emergency receiving unit, in parallel to its means for receiving general messages, i.e., Pre-Amplifier 51, Frequency Shifter 53, and analog to digital converters 58. As will hereinafter be discussed in more detail, an emergency message comprises, at the beginning of the SOS message, the transmission of consecutive "1" bits during a period of 6 seconds. Therefore, the emergency receiving unit 50 is similar in its structure to the structure shown in FIG. 5, however, it is actually designed to detect only the said consecutive "1"s. When such a detection occurs, the microprocessor immediately switches the means for receiving a general message, i.e., the means indicated as blocks 38 and 40, to receive the emergency message, simply by tuning the frequency shifter 38 to the tetrad of frequencies of the emergency message, by providing to the said frequency shifter the tetrad of frequencies of the emergency channel, instead of the tetrad of frequencies of the user, as is generally provided to the frequency shifter from the PAL. Therefore, the means for detecting an emergency message which are indicated by blocks 53 and 58, are actually half the size of the corresponding blocks for detecting a general message, as they are used only for detecting "1" consecutive bits during a period of 6 seconds. Thereafter, the whole emergency message is transferred via the route of the general messages. Then, when a device activates an SOS message, the said SOS receiving units on all the devices in the network receive said SOS message and consequently, display the SOS message and identification code of the device which sent it, and activate a special SOS alarm. According to another embodiment of the invention, the device may include only one receiving unit, that will continuously switch between the emergency channel and the user designated channel, to check whether a message has been received in either of said channels. However, this is less reliable.

According to a preferred embodiment of the invention, each personal device is also capable of sending a message (for example, message#14) which is especially assigned for causing the receiving device, upon receiving said message, to respond with transmitting its emergency (SOS) message. This option is particularly important in emergency cases, when a communication with a diver carrying a device is lost. Then, the transmitted SOS message may assist special locating devices to locate the lost device and diver, that may be in an emergency situation. The addition of this option to the personal device according to the invention involves only the addition of some software definitions which are very simple and within the scope of those skilled in the art.

According to still another embodiment of the invention, the device may include conversion means for converting a received message or message identification code to voice, and means for sounding the converted audio: message to the-device holder.

It has been found that the above described method for transmitting underwater messages, binary-FSK modulated with diversity, significantly enhances the reliability of underwater communication, and particularly provides means for overcoming ambient disturbances, multipath disturbances, and fading of the propagating signal, which particularly occur due to reflections from the water surface in rough sea conditions. More specifically, it has been found that a significant improvement in the reliability of transmission has been achieved due to the use of binary-FSK with diversity, in comparison to binary-FSK with no diversity, as it has been found that fading of the signal, when it occurs, generally affects only one of the two simultaneously transmitted frequencies and almost at any moment at least one of the two transmitted frequencies is not affected by fading. Of course, the range of transmission depends on the power of transmission, on ambient conditions, and on the sensitivity of the hydrophone used. Furthermore, it has been found that messages can be transferred even when a line of sight between the sending and the addressee device does not exist.

Furthermore, the network of personal devices according to the invention may optionally be expanded to include one or more relay apparatuses, and/or a base station. A relay apparatus according to the invention is a unit which is provided with means for receiving modulated signals from any personal device, to amplify it, and to retransmit it, thereby to enlarge the range of the network. Some relay apparatuses may further include means for receiving electromagnetic modulated signals by any conventional means, means for converting said signals to ultrasound acoustic signals and means for retransmitting the converted signals to any personal device. Furthermore, said relay apparatuses may also be provided with means for receiving ultrasound acoustic signals, means for converting the signals into electromagnetic signals, and means for transmitting said electromagnetic signals by any conventional means. Each base station, where such exist, should include means for communicating with any personal device, or relay apparatus, for making any bidirectional communication by conventional means out of water, and ultrasound acoustic waves underwater. The said base station may also include staff for assisting in the maneuvering of messages, and/or controlling actions underwater by personal device holders. Furthermore, the above described method, apparatus and system can be applied, with minor adaptations and modifications well known to those skilled in the art, not only to personal devices (beepers) as described, but also to underwater ROV (Remote Operated Vehicle) and AUV (Automatic Underwater Vehicle) apparatuses and systems, for wireless remote controlling of the operation of such underwater vehicles.

General Message Transmission

The procedure for transmitting a general message, according to one embodiment of the invention, comprises the following steps:

1. The sender selects a message out of the preset messages stored in the memory, and the identification code of the addressee member (and optionally, the network identification code);
2. The sender presses the SEND button of his personal device;
3. Then, the device of the sending member switches to the listening mode, i.e., to receive in the channel of the addressee in order to check whether the channel of the addressee is occupied by another transmission. The device remains in the listening mode for a period of about 2 Tbits (two transmission bits). It should be noted that according to one embodiment of the invention, the duration of each transmission bit (Tbit) is 87 milliseconds, and therefore the average transmission rate is about 11.5 bps..
4. If the device finds that the channel of the addressee is occupied, then the transmission of the message is postponed.
5. If, however, the sending device finds that the channel of the addressee is not occupied, it switches to the transmitting mode, in the tetrad of frequencies that is assigned to the addressee user, and first sends 7, "1" level wake-up bits (i.e., for a duration of 7 Tbits). The purpose of these bits is to notify the addressee device that a message follows and to prepare the addressee device for receiving the following message.
6. Next, a "0" level start bit follows, its duration being 1 Tbit.
7. Next, three bits indicating the network identification code of the sender follow (assuming no more than 8 networks operate in the same area).
8. Next, 4 bits indicating the message# (assuming no more than 16 preset messages).
9. Next, 4 bits indicating the identification code of the sender (assuming no more than 16 members in the network); and
10. Finally, a parity bit summing the parity of the network identification code, the message#, and the sender's identification code.
11. After the parity bit, the transmission ends and the unit switches back to the receiving mode.

Figure 6:
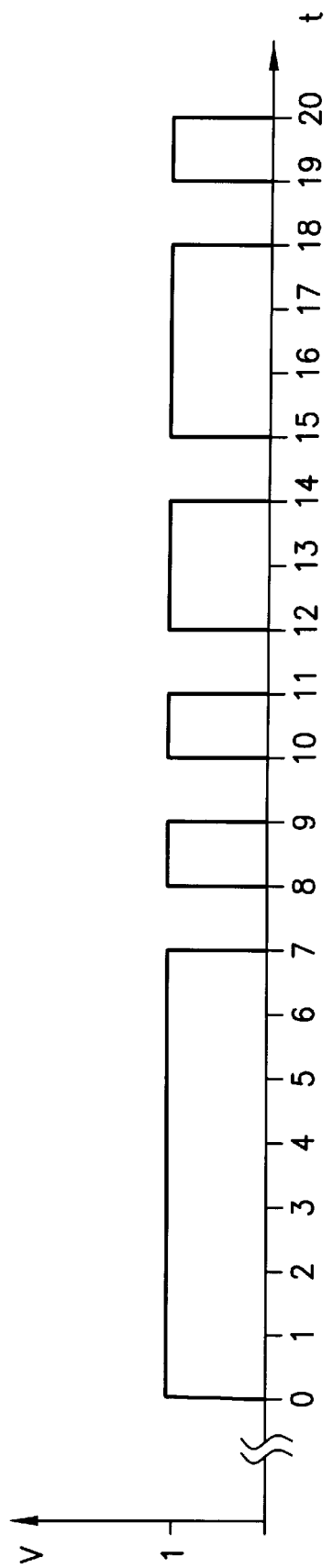
FIG. 6 shows an exemplary of a string which includes seven wake-up bits, a starting bit, a network code, a message code, the sender identification code, and a parity bit according to one embodiment of the invention.

Of course, the number of bits given above are only an example, and may vary. A typical signal relating to the transmission of a message #7 (0110 binary), from a user #15 (1110 binary) of network #6 (101 binary) according to the above, is shown in FIG. 6. Back acknoledgement message is then sent by the receiving device upon receipt of the message, the acknoledgement message includes indication on the network#, the receiving device#, and the message# received.

Acknowledgment Message Transmission

After receiving the above message, the receiving device decodes the received message, and displays on the display the full message relating to the message index received (message#) by fetching said full message from the memory, the identification code of the transmitting device, and the network identification code. Also, a buzzer is activated. Furthermore, the receiving device sends back an acknowledgment message. The format of the acknowledgment message is as follows:

1. First, seven wake-up bits are sent (7 Tbits).
2. Next, a "0" level start bit follows, its duration being 1 Tbit.
3. Next, the three network identification bits of the network to which the receiving device belongs follow.
4. Next, four bits indicating the message# corresponding to the acknowledgment message follow (assuming there are no more than 16 preset messages. Also, as said, the acknowledgment message is considered as a service message, not accessible for regular transmission).
5. Next, 4 bits indicating the identification code of the receiving device follow (assuming there are no more than 16 members in the network); and 6. Finally, a parity bit summing the parity of the network identification code, the message#, and the receiving device identification code.

Figure 9:
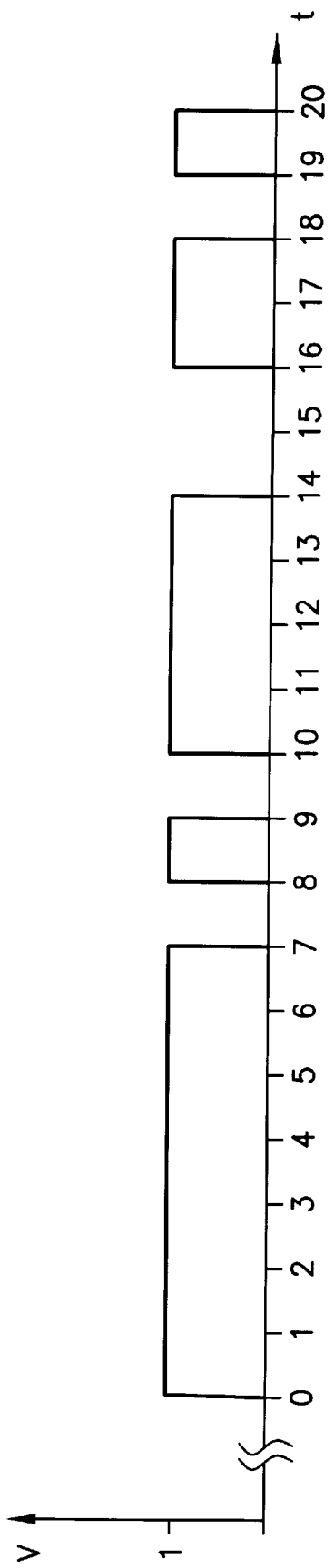
FIG. 9 shows an exemplary of an acknowledgment string which includes a seven wake-up bits, starting bit, a network code of the receiving device, the acknowledgment message code, the receiving device identification code, and a parity bit, according to one embodiment of the invention.

Of course, the number of bits given above are only for example, and may vary. A typical signal relating to the transmission of an acknowledgment message (message #15 (1110 binary), from a receiving device #7 (0110 binary) of network #6 (101 binary) according to the above, is shown in FIG. 9.

SOS transmission

1. A member in an emergency has to press twice the SOS button, or another non-trivial combination, in order to initiate an SOS message. Then, consecutive "1" level bits are transmitted for a period of 6 seconds, in the emergency tetrad of frequencies, to all users in the network (and optionally, to users of other networks, assuming all are assigned the same tetrad of frequencies for emergency). The purpose of this transmission is to clean the water from the transmission of other messages initiated by other users.

2. Then, a transmission of a "0" level start bit follows (1 Tbit)

3. Then, a transmission of 3 bits indicating the network identification code of the sender follows.

4. Next, four bits indicating the sender identification code are transmitted.

5. Again, the same four bits, indicating the sender identification code, follow.

6. Finally a parity bit summing the parity of the sender's network identification code and of the sender's identification code follows.

7. The full emergency signal is transmitted twice, and then repeated. The repetition rate is different in different devices, for example T=30 sec+30*(device identification code). This may assist, in the event a weak SOS signal is received, to determine, by analyzing the repetition rate, the device which initiated the SOS signal.

It should be noted here that an emergency signal is treated immediately by the receiving device, independent of its status.

EXPERIMENTS

The following experiments were carried out with devices according to the invention:

1. A first experiment with a device according to one embodiment of the invention, transmitting a power of 1 watt, and using omnidirectional hydrophones model No. 970060 by "Airmar", of Milford, N.H., in both the sending and receiving devices, was carried out. Messages were reliably transferred (without any detected errors) to a range of 1500 m. The experiment was carried out while the transmitting and receiving devices were at a depth of 1–2 meters. It should be noted that the communication in this depth particularly suffers from multipath effects, much more than the communication in deeper water. When the same experiment was carried out at a depth of 40 meters, messages were reliably transferred (without any detected errors) to a range of 1840 m. It should be noted that there was no line of sight between the transmitting device and the receiving device, as there was a peninsula between the transmitting and receiving locations..

2. A second experiment with a device according to a second embodiment of the invention, transmitting a power of 9 watts and using same hydrophone as above, was carried out in the same conditions and locations as in the previous experiment (section 1 above). Messages were reliably (without any detected errors) transferred to a range of 4500 m.

3. Experiments have shown that the use of the combination of binary-FSK with diversity, according to the invention, provides an improvement of 6 db, in comparison with underwater transmission with no diversity.

While some embodiments of the invention have been described by way of illustration, it will be apparent that the invention can be carried into practice with many modifications, variations and adaptations, and with the use of the numerous equivalents or alternative solutions that are within the scope of persons skilled in the art, without departing from the spirit of the invention or exceeding the scope of the claims.

What is claimed is:

1. A personal underwater communication device comprising:

a display;

a memory unit, said memory unit having a plurality of stored preset messages, each of said preset messages having a unique message identification code;

means for assigning and storing in said memory unit a unique device identification code corresponding to said device, and unique identification codes corresponding to one or more other devices;

means for selecting one of said unique identification codes corresponding to a selected other device;

means for selecting one of said preset messages to be transmitted;

means for encoding said selected message identification code and said other device identification code into a string;

means for modulating said string with an ultrasound acoustic modulating frequency to produce a modulated signal;

means for transmitting said modulated signal through water;

means for receiving a modulated signal transmitted through water;

means for demodulating said transmitted modulated signal to produce a demodulated string;

means for decoding said demodulated string to produce a demodulated message and a demodulated other device identification code; and means for displaying on said display said decoded message and said decoded other device identification code.

2. A personal underwater communication device according to claim 1, wherein said modulating means modulates said string with a binary-FSK modulation scheme with a pair of acoustic ultrasound frequencies assigned as the receiving frequencies of said other device, a first frequency of said pair for indicating a "1" level of the string, and a second frequency of said pair for indicating a "0" level of the string.

3. A personal underwater communication device according to claim 2, further comprising means for selecting any one pair of a plurality of pairs of ultrasound frequencies which has been previously assigned to said other device.

4. A personal underwater Communication device according to claim 1, further comprising means for indicating that said receiving means has received a modulated signal.

5. A personal underwater communication device according to claim 1, wherein said modulating means modulates said string with a binary-FSK modulation scheme with diversity having at least two pairs of acoustic ultrasound frequencies, a first frequency of each pair for indicating a "1" level of said string, and a second frequency of each pair for indicating a "0" level of said string, said at least two pairs of frequencies matching said at least two pairs of frequencies assigned as the receiving frequencies of said other device.

6. A personal underwater communication device according to claim 5, wherein a diversion is provided between a lair of frequencies for indicating "1" or "0" levels of said string from the at least one additional pair of frequencies for indicating the same "1" or "0" levels of said string, said diversion between said two pairs of frequencies being about at least 10 times the difference between the frequencies for indicating "1" or "0" levels in the same pair.

7. A personal underwater communication device according to claim 6, wherein said diversion is in the range of between about 1 kHz to 200 kHz.

8. A personal underwater communication device according to claim 5, wherein said receiving means comprises a hydrophone for sensing an acoustic modulated ultrasound signal, a pre-amplifier for amplifying said sensed modulated ultrasound signal, a frequency shifter for passing only frequencies which are assigned to said device, converting means for converting said passed frequencies to low frequency components, and a low pass filtering means for passing only said low frequency components.

9. A personal underwater communication device according to claim 8, wherein said demodulating means comprises an analog to digital converter means for separately converting each passed low frequency component to a digital value, a first circuitry for adding digital values resulting from frequencies indicating a "1" level, and a second circuitry for adding digital values resulting from frequencies indicating a "0" level, and a logic means for comparing the results from said first and said second circuitry means to determine whether a or "0" bit is received.

10. A personal underwater communication device according to claim 1, further comprising means for transmitting emergency (SOS) signals, means for receiving emergency (SOS) signals, and means for indicating that an emergency (SOS) signal has been received.

11. A personal underwater communication device according to claim 10, wherein said emergency signal transmitting means comprises means for producing a string encoding an emergency message and said device identification code, and means for modulating said string with at least one ultrasound acoustic modulating frequency characteristic of emergency situations to produce a modulated emergency signal.

12. A personal underwater communication device according to claim 10, wherein said emergency (SOS) signal receiving means comprises means for receiving ultrasound acoustic modulated emergency signals in at least one frequency which is characteristic of emergency situations, and means for demodulating said received modulated emergency signals to produce a demodulated emergency string.

13. An underwater communication network system comprising a plurality of personal underwater communication devices, wherein each device comprises:
   a display;
   a memory unit for storing a plurality of preset messages each having a unique message identification code;
   means for assigning and storing in said memory unit a unique device identification code for each of said plurality of personal underwater communication devices;
   means for selecting one of said plurality of preset messages for transmission;
   mean for selecting a receiving device to receive said transmission of said one of said plurality of preset messages;
   means for encoding said unique message identification code for said one of said plurality of preset messages and said unique device identification code of said receiving device into a string;
   means for modulating said string with a modulating frequency to produce an ultrasound acoustic modulated signal;
   means for transmitting said modulated signal in water;
   means for receiving a modulated signal;
   means for demodulating said received ultrasound acoustic modulated signal to produce a demodulated string;
   means for decoding said demodulated string to produce said unique message identification code for said one of said plurality of preset messages and said unique device identification code of said receiving device; and
   means for displaying on said display said decoded one of said plurality of preset messages and said unique device identification code of said receiving device.

14. An underwater communication network system according to claim 13, further comprising a relay apparatus.

15. An underwater communication network system according to claim 13, further comprising a base station.

16. An underwater communication network system according to claim 14, wherein said relay apparatus is an acoustic-to-acoustic repeater apparatus comprising means for receiving an underwater ultrasound acoustic modulated signal, means for amplifying said modulated signal and means for re-transmitting said amplified modulated signal.

17. An underwater communication network system according to claim 14, wherein said relay apparatus is a non-acoustic-to-acoustic apparatus comprising means for receiving a message transmitted by wire or wireless means from an out-of-water source, means for converting said message to an ultrasound acoustic modulated signal, and means for transmitting said modulated signal to an underwater personal device or to another relay apparatus.

18. An underwater network system according to claim 17, wherein said relay apparatus further comprises means for receiving an ultrasound acoustic modulated signal sent by an underwater personal device, means for converting said signal to an electromagnetic signal, and means for transmitting said electromagnetic signal to an out of water address.

19. An underwater network system according to claim 15, wherein said base station comprises means for receiving a message from any out-of-water source, and means for transmitting said message to an underwater personal device or relay apparatus, and means for receiving a message from an underwater personal device or relay apparatus, and means for transmitting said message to an out-of-water device.

20. An underwater network system according to claim 14, wherein said relay apparatus is a floating apparatus.

21. A method of communicating between underwater devices comprising the steps of:
   assigning to a transmitting device an identification code;
   assigning to a receiving device at least two pairs of acoustic ultrasound frequencies, a first frequency of each pair for indicating a "1" level, and a second frequency of each pair for indicating a "0" level;
   encoding, at said transmitting device, a binary string comprising a message and said transmitting device identification code;
   modulating said string with said at least two pairs of acoustic ultrasound frequencies, said frequencies being identical to said at least two pairs of frequencies assigned to said receiving device, to produce a modulated signal;

tuning said transmitting device to receive signals in said at least two pairs of frequencies assigned to said receiving device;

transmitting said modulated signal to said receiving device;

receiving said modulated signal at said receiving device;

demodulating said received modulated signal to produce a string;

decoding said string to produce a decoded message and a decoded identification code of said transmitting device;

displaying said decoded message and said decoded identification code;

encoding a binary string containing an acknowledgment message and a receiving device identification code;

modulating said string with at least two pairs of acoustic ultrasound frequencies, said frequencies being identical to said at least two pairs of frequencies assigned to said transmitting device to produce a modulated acknowledgment signal; and transmitting said modulated acknowledgment signal to said transmitting device.

22. A method for transmitting underwater messages according to claim 21, wherein said receiving means is a hydrophone.

23. A method for transmitting underwater messages according to claim 21, wherein said transmitting device and said receiving devices are both a transmitting device and a receiving device.

24. A method for transmitting underwater messages according to claim 21, wherein said modulation of said string at said transmitting device is Binary-FSK modulation and said demodulation at said receiving device is Binary-FSK demodulation.

25. A method for transmitting underwater messages according to claim 21, wherein said modulation of said string at said transmitting device is Binary-FSK modulation with diversity and said demodulation at said receiving device is Binary-FSK demodulation with diversity.

26. A method for transmitting underwater messages according to claim 21, wherein each pair of frequencies is separated from another pair of frequencies by a frequency of between about 1 kHz to 200 kHz.

27. A personal underwater communication device according to claim 1, wherein said preset messages comprise general messages for transmission, an acknowledgment of receipt message, an SOS message, instructive messages for the user of the device, and other messages as needed.

28. A personal underwater communication device according to claim 27, wherein said acknowledgement message is sent automatically by said receiving device to said transmitting device upon receipt of a message.

29. An underwater communication device according to claim 1, wherein said signals are used for controlling an Automatic Underwater Vehicle (AUV) or a Remote Underwater Vehicle (ROV).

30. An underwater communication device according to claim 1, further comprising means for loading and/or replacing said preset messages by an external device.

31. An underwater communication device according to claim 1, further comprising buttons for operating said device.

32. An underwater communication device according to claim 31, wherein said buttons are piezoelectric buttons.

33. An underwater communication device according to claim 1, further comprising an ON-OFF switch for activating said device.

34. An underwater communication device according to claim 33, wherein said ON-OFF switch is a water-activated switch.

35. An underwater communication device according to claim 27, wherein said preset messages further comprise a message for instructing a receiving device to transmit an emergency (SOS) message.

36. An underwater communication device according to claim 35, further comprising means for initiating a transmission of said emergency (SOS) message upon receipt of a message instructing to said device to transmit said emergency (SOS) message.

37. An underwater communication device according to claim 1, wherein said display is an LCD display.

38. An underwater communication device according to claim 37, wherein said LCD display is an alpha numeric display.

39. A personal underwater communication device for transmitting a user selected textual message for reception by a user selected receiving device, and for receiving and displaying a textual message from another underwater communication device, said communication device comprising:

a display for displaying a textual message received from the another underwater communication device;

a processor for providing an output to said display, said processor including memory within which is stored a plurality of textual messages and a unique message identification code for each of said stored plurality of textual messages, and a plurality of unique device identification codes for each of a plurality of other underwater communication devices, including unique device identification codes for the user selected receiving device and the another underwater communication device; and a hydrophone for transmitting and receiving, by said device, a transmitted acoustic signal and a received acoustic signal;

said processor modulating one of said stored plurality of message identification codes that corresponds to the user selected textual message and communicating said modulated message identification code to said hydrophone for transmission thereby as the transmitted acoustic signal for receipt by the user selected receiving device;

said processor demodulating the received acoustic signal transmitted by the another underwater communication device for receipt by said device, the received acoustic signal including one of said stored plurality of message identification codes corresponding to a textual message selected by a user of the another underwater communication device, said processor causing the textual message selected by the user of the another underwater communication device to be displayed by said display.

40. A personal underwater communication device as recited by claim 39, wherein said processor comprises:

a modulator comprising a binary-frequency-shift-keying (B-FSK) modulator for modulating said message identification code corresponding to said user selected textual message using a modulation frequency unique to the user selected receiving device, and a digital-to-analog converter for converting the B-FSK modulated message identification code to a modulated analog signal;

said underwater communication device further comprising a power amplifier coupled to said processor for amplifying the modulated analog signal, and coupled to said hydrophone for transmission of the amplified modulated signal as an acoustic signal.

41. A personal underwater communication device as recited by claim 39, wherein said processor comprises:

a frequency detector for detecting a frequency unique to said device in the received acoustic signal;

an analog-to-digital converter for converting the received acoustic signal to a B-FSK modulated message identification code corresponding to a textual message selected by the user of the another underwater communication device; and a B-FSK demodulator for demodulating the message identification code using said frequency unique to said device;

said processor causing the textual message selected by the user of the another underwater communication device to be displayed in said display of said device.

42. A personal underwater communication device as recited by claim 39, wherein the received acoustic signal includes the unique device identification code for the another underwater communication device, and wherein said processor automatically communicates an acknowledgment of reception of the received acoustic signal to the another underwater communication device.

43. An underwater communication network comprising a plurality of underwater communication devices for transmitting a textual message to at least one user selected other underwater communication device and for receiving and displaying a textual message from at least one other underwater communication device, wherein each said underwater communication device comprises:

a display for displaying a textual message received from the at least one other underwater communication device;

an input device;

a processor for receiving input from said input device and for providing an output to said display, said processor including memory within which is stored a plurality of textual messages and a unique message identification code for each of said stored plurality of textual messages, and a plurality of unique device identification codes for each of the plurality of underwater communication devices in said network, a user of said device selecting, using said input device, one of said stored plurality of textual messages for transmission and at least one of the plurality of underwater communication devices as a receiving device to receive said transmission; and a hydrophone for transmitting and receiving an acoustic signal;

said processor modulating the message identification code corresponding to said user selected one of said stored plurality of textual messages, and communicating said modulated one of said stored plurality of message identification codes to said hydrophone for transmission thereby as a transmitted acoustic signal for receipt by the user selected receiving device;

said processor demodulating a received acoustic signal transmitted by at least one other underwater communication device for receipt by said device, the received acoustic signal including one of said stored plurality of message identification codes corresponding to a textual message selected by a user of the at least one other underwater communication device, said processor causing the textual message selected by the user of the at least one other underwater communication device to be displayed by said display.

44. A personal electronic underwater communication device for transmitting a textual message to a user selected electronic underwater communication device and for receiving and displaying a textual message from another electronic underwater communication device, said underwater communication device comprising:

a display for displaying a textual message received from the another electronic underwater communication device;

a processor for providing an output to said display, said processor including memory within which is stored a plurality of textual messages and a unique message identification code for each of said stored plurality of textual messages, and a plurality of unique device identification codes for each of a plurality of other electronic underwater communication devices, including unique device identification codes for the user selected receiving device and the another electronic underwater communication device; and a hydrophone for transmitting and receiving by said device, a transmitted acoustic signal and a received acoustic signal;

said processor modulating one of said stored plurality of message identification codes that corresponds to the user selected textual message and communicating said modulated message identification code to said hydrophone for transmission thereby as the transmitted acoustic signal for receipt by the user selected receiving device;

said processor demodulating the received acoustic signal transmitted by the another electronic underwater communication device for receipt by said device, the received acoustic signal including one of said stored plurality of message identification codes corresponding to a textual message selected by a user of the another electronic underwater communication device, said processor causing the textual message selected by the user of the another electronic underwater communication device to be displayed by said display.

45. A personal electronic underwater communication device as recited by claim 44, wherein the received acoustic signal includes the unique device identification code for the another electronic underwater communication device, and wherein said processor automatically communicates an acknowledgment of reception of the received acoustic signal to the another electronic underwater communication device.

* * * * *